May 4, 1965
C. W. SCHOENFELDER  3,181,305
METHOD FOR ISOLATING NITROGEN TRIFLUORIDE FROM NITROUS OXIDE AND TETRAFLUOROHYDRAZINE
Filed April 10, 1963
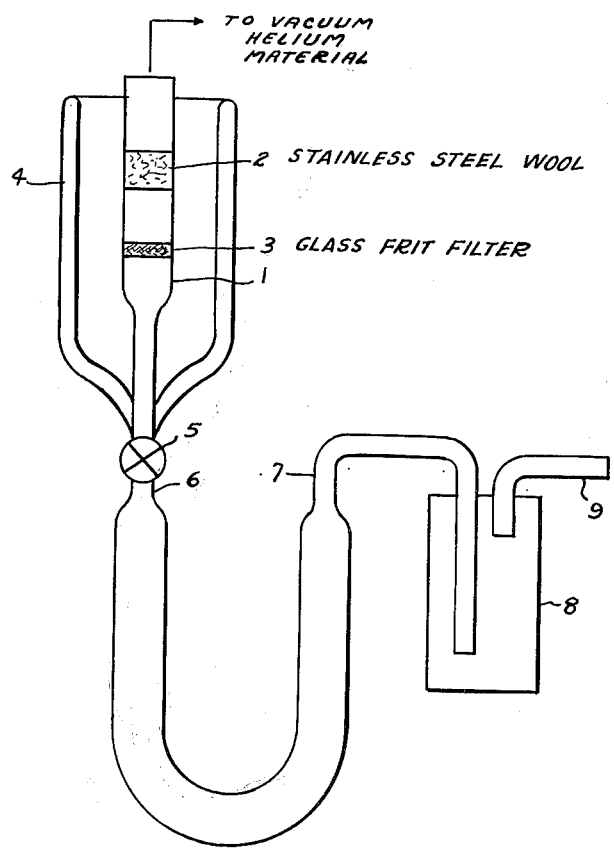
INVENTOR.
CARL W. SCHOENFELDER
BY
ATTORNEYS

3,181,305
METHOD FOR ISOLATING NITROGEN TRIFLUORIDE FROM NITROUS OXIDE AND TETRAFLUOROHYDRAZINE
Carl W. Schoenfelder, Livermore, Calif., assignor to the United States of America as represented by the Secretary of the Air Force
Filed Apr. 10, 1963, Ser. No. 272,165
4 Claims. (Cl. 62—12)

This invention is a process for isolating nitrogen trifluoride from nitrous oxide and from tetrafluorohydrazine.

Nitrogen trifluoride is useful as an intermediate in the synthesis of high energy liquid and solid propellants. Precision in its composition, in its purity and in its freedom from contaminants, are essential for accuracy in the preparation of reproducible reactions, whenever it must be used as a reagent, as a reactant, or the like.

Nitrogen trifluoride is prepared by the electrolysis of ammonium bifluoride or by the fluorination of ammonia. Raw nitrogen trifluoride commonly contains as an undesirable impurity nitrous oxide, with or without the presence of tetrafluorohydrazine.

Prior to the present invention, no efficient way has existed for removing the nitrous oxide from nitrogen trifluoride. The simple trap-to-trap distillation of the raw product within a vacuum apparatus has proven ineffective. Low temperature fractionation in a still is not effective at the temperatures involved, because of the short temperature range of about 14° C. over which the nitrous oxide is in its liquid state.

The object of the present invention is to provide a simple and efficient method for removing from nitrogen trifluoride the objectionable nitrous oxide alone, or also removing tetrafluorohydrazine, by fractional crystallization and by the fractionation of liquids.

A filtering apparatus that is used in the present process is indicated diagrammatically in the single figure of the accompanying drawing.

The indicated apparatus comprises a tubular filtering section 1 that has its upper intake end connectable to a source of the raw material to be purified or isolated, to a source of helium gas or other comparable inert gas, and to a vacuum system, as indicated on the sketch.

The apparatus tubular filtering section 1 contains inside of and adjacent to its upper end, a permeable wad or pad of stainless steel wool of high thermal conductivity as a steel wool trap 2 above a physical state transition zone. Spaced an adequate distance below the steel wool trap 2 is a permeable wad of sintered glass frit of medium porosity that serves as a filter trap 3.

The tubular filtering section 1 is inside of or is substantially immersed in an evacuated flask 4 that contains liquid nitrogen for maintaining the temperature of the filtering section 1 at about the temperature of $-196°$ C.

The apparatus chilling and filtering section 1 is connected downwardly to the upper intake end of a handle-operated stopcock 5 and below the stopcock into the U-tube input leg 6. The U-tube has its output leg 7 connected directly to a vacuum system, not shown, or through a collecting bottle 8, as preferred.

The method of isolating nitrogen trifluoride from a raw mixture of nitrogen trifluoride and nitrous oxide, with or without tetrafluorohydrazine being in the mixture, may be from their vapor state or from their liquid state, as preferred, since the boiling points of the involved compounds are reported to be:

| | ° C |
|---|---|
| Nitrogen trifluoride | $-120$ |
| Nitrous oxide | $-88.5$ |
| Tetrafluorohydrazine | $-73$ |

With the stopcock 5 closed, the raw mix is introduced into the upper end of the section 1. The rate of supplying the raw mixture to the section 1 is such that the wad of stainless steel wool, of the steel wool trap 2, rapidly extracts heat from the raw mixture in converting the raw mixture from a gas to a liquid that passes through the steel wool 2 and into the physical state transition zone beneath the trap 2.

At $-196°$ C., the nitrogen trifluoride remains liquid, since its melting point is reported to be $-216.6°$ C., and the nitrous oxide solidifies since its melting point is $-102.4°$ C. This transition in physical state from gas to liquid, then from liquid to solid, is caused to occur below the steel wool 2 and above the glass frit filter trap 3, with the stopcock 5 closed.

The gaseous mixture of nitrous oxide which has the symbol $N_2O$, and nitrogen trifluoride which has the symbol $NF_3$, that is introduced into the upper end of the tubular section 1, is condensed in the upper portion of the section with the stainless steel wool 2 providing a large cold surface for more effective condensation. Upon condensation, the solid nitrous oxide collects on top of the medium porosity sintered glass frit filter trap 3 which frit is permeated by the liquid nitrogen trifluoride.

The stopcock 5 is then opened and helium gas is forced into the upper end of the tubular section 1 above the liquid therein. The helium gas pressure is applied to the surface of the nitrogen trifluoride and drives it downwardly through the solidified nitrous oxide on the upper surface of the medium porosity sintered glass frit filter trap 3, through the frit filter trap 3 and through the open stopcock 5 and causes the liquid nitrogen trifluoride to flow into the U-tube.

The nitrogen trifluoride is tansferred out of the U-tube into the collecting bottle 8, with the stopcock 5 open, by vacuum pressure applied to the tube 9 of the collecting bottle 8, or otherwise, as preferred.

The nitrous oxide precipitate remains on top of the filter trap 3 in the section 1.

The nitrogen trifluoride filtrate appears as a water clear liquid and its analysis shows that it is over 99% pure nitrogen trifluoride.

The above-described method for accomplishing the isolation of nitrogen trifluoride from its contamination with nitrous oxide, also is employed when the raw nitrogen trifluoride vapor is contaminated with both nitrous oxide and tetrafluorohydrazine. The preparation of tetrafluorohydrazine is described briefly in the Patent No. 2,972,519 that was issued to R. D. Lipscomb on February 21, 1961, and in the publication cited therein.

The raw nitrogen trifluoride that contains both nitrous oxide and tetrafluorohydrazine is obtained from the pyrolysis of nitrogen trifluoride over a bed of copper gauze in the temperature range of between 375° C. and 450° C. At the temperature $-196°$ C. of liquid nitrogen, tetrafluorohydrazine is soluble in nitrogen trifluoride and nitrous oxide solidifies and is not soluble in the liquid fractions.

The mixture of nitrous oxide, tetrafluorohydrazine and nitrogen trifluoride is introduced in either their vapor or their liquid states in the upper end of the tubular section 1 represented in the drawing. At the temperature $-196°$ C. and following the above-described procedure, substantially the total content of nitrous oxide in its solid state remains as precipitate on top of the medium porosity sintered glass frit filter trap 3. The liquid nitrogen trifluoride or $NF_3$ and the liquid tetrafluorohydrazine or $N_2F_4$ pass through the filter trap 3 and into the U-tube.

The nitrogen trifluoride is removed from the U-tube by pumping it at $-160°$ C. to leave within the U-tube a residue that is a very pure tetrafluorohydrazine, as is shown by its infrared spectrum, and with the nitrogen trifluoride passing into the collecting bottle 8. If preferred, a separatory funnel may be used at −160° C. in accomplishing this separation of the two liquids.

The described low temperature filtration and separation method as disclosed herein is effectively employed to remove first the solid, insoluble component from the material that is liquid at the temperature of the filtration and then by the separation of the two liquid fractions.

It is to be understood that the apparatus, the method or process, the reactants, the reagents, etc., that are described herein are of a successfully operative embodiment of the present invention, and that similar modifications can be made herein without departing from the spirit and the scope of the present invention.

I claim:
1. The process for preparing nitrogen trifluoride comprising passing a gaseous composition containing the nitrogen trifluoride contaminated by the presence of nitrous oxide and tetrafluorohydrazine through a stainless steel wool high-thermal conductivity trap maintained at the temperature of liquid nitrogen to within the physical state transition zone between the steel wool trap and a filter trap of sintered glass frit of medium porosity, in which transition zone nitrogen trifluoride and the tetrafluorohydrazine remain liquid and the nitrous oxide is altered to its solid physical state; forcing helium gas onto the liquid and the solid on the filter trap and causing the liquid nitrogen trifluoride and the liquid tetrafluorohydrazine to pass through the filter trap leaving the solid nitrous oxide on the high pressure side of the filter trap; collecting in a container the filtrate liquid nitrogen trifluoride and the liquid tetrafluorohydrazine on the low pressure side of the filter trap at the temperature −160° C.; and pumping the nitrogen trifluoride at −160° C. away from the tetrafluorohydrazine that remains within the container.

2. The process for isolating nitrogen trifluoride from a raw gaseous mixture of nitrogen trifluoride, nitrous oxide and tetrafluorohydrazine comprising the steps of passing the raw mixture in the fluid state through a temperature reducing, stainless steel wool trap maintained at below the temperature at which nitrous oxide solidifies and at which temperature the nitrogen trifluoride and the tetrafluorohydrazine are in the liquid state after passing through the stainless steel wool trap within a physical state transition zone wherein the solidified nitrous oxide is dispersed in the liquid nitrogen trifluoride mixed with the liquid tetrafluorohydrazine adjacent a filter trap of sintered glass frit of medium porosity within the physical state transition zone below the stainless steel wool trap; applying a physical pressure differential to the contents of the physical state transition zone and causing the liquid contents thereof to pass through the filter trap into a second container of the liquid fraction and causing the solid residue to remain in the physical state transition zone on the sintered glass frit filter trap, with the temperature of the contents of the first container at the temperature of −160° C.; and at the temperature −160° C. pumping the nitrogen trifluoride away from the tetrafluorohydrazine.

3. The method for isolating nitrogen trifluoride from its mixture with nitrous oxide and tetrafluorohydrazine by reducing the temperature of the mixture by passing it through a stainless steel wool trap into a physical state transition zone within a first container maintained at the temperature of liquid nitrogen and wherein substantially all of the nitrous oxide in the mixture is in its solid physical state and the nitrogen trifluoride and the tetrafluorohydrazine are in their liquid physical states above a sintered glass frit filter trap; applying a physical pressure differential to the contents of the physical state transition zone in passing the liquid nitrogen trifluoride and the liquid tetrafluorohydrazine through the filter trap on which the solidified nitrous oxide remains, into a second container where the second container and its contents are maintained at the temperature of −160° C.; and withdrawing by a pressure differential the nitrogen trifluoride from the second container into a third container away from the tetrafluorohydrazine remaining in the second container as residue.

4. The method of isolating nitrogen trifluoride from nitrous oxide in a mixture thereof by passing the mixture through a stainless steel wool trap into a physical state transition zone first container maintained at the temperature of liquid nitrogen wherein the nitrous oxide solidifies and the nitrogen trifluoride is liquid and which first container contains a sintered glass frit filter trap; applying a pressure differential to the contents of the physical state transition zone first container and passing the liquid nitrogen trifluoride through the filter trap as filtrate, as the solidified nitrous oxide remains on the filter trap as precipitate; and transferring the nitrous oxide free nitrogen trifluoride into a second container.

References Cited by the Examiner
UNITED STATES PATENTS

| | | | |
|---|---|---|---|
| 1,057,052 | 3/13 | Guye. | |
| 1,331,105 | 2/20 | Guye. | |
| 2,177,139 | 9/39 | Horvitz | 62—12 |
| 2,370,703 | 3/45 | Zaikowsky | 62—12 |
| 3,043,662 | 7/62 | Lipscomb | 23—205 X |
| 3,101,262 | 8/63 | Rottmayr | 62—23 |

FOREIGN PATENTS 48,712  10/18  Sweden.

NORMAN YUDKOFF, *Primary Examiner.*